(12) United States Patent
Kudo et al.

(10) Patent No.: US 8,162,644 B2
(45) Date of Patent: Apr. 24, 2012

(54) DIE FOR EXTRUSION FORMING HEAD

(75) Inventors: Shigeo Kudo, Osaka (JP); Tetsuo Tatara, Osaka (JP); Osamu Fujiki, Osaka (JP)

(73) Assignee: Toyo Tire & Rubber Co., Ltd., Osaka-shi, Osaka (JP)

( * ) Notice: Subject to any disclaimer, the term of this patent is extended or adjusted under 35 U.S.C. 154(b) by 641 days.

(21) Appl. No.: 12/161,088

(22) PCT Filed: Jan. 17, 2006

(86) PCT No.: PCT/JP2006/300490
§ 371 (c)(1),
(2), (4) Date: Apr. 3, 2009

(87) PCT Pub. No.: WO2007/083346
PCT Pub. Date: Jul. 26, 2007

(65) Prior Publication Data
US 2010/0119636 A1    May 13, 2010

(51) Int. Cl.
*B29C 47/94* (2006.01)
(52) U.S. Cl. .......... 425/72.1; 425/113; 425/133.1; 425/462
(58) Field of Classification Search .......... 425/72.1, 425/113, 131.1, 133.1, 462
See application file for complete search history.

(56) References Cited

U.S. PATENT DOCUMENTS

| | | | | |
|---|---|---|---|---|
| 2,620,515 A | * | 12/1952 | Olson | 264/557 |
| 4,286,935 A | * | 9/1981 | Okuno et al. | 425/72.1 |
| 4,394,338 A | * | 7/1983 | Fuwa | 264/135 |
| 4,820,470 A | * | 4/1989 | Ferrero | 264/555 |
| 5,258,160 A | * | 11/1993 | Utsumi et al. | 264/558 |
| 5,843,503 A | * | 12/1998 | Clanton et al. | 426/249 |
| 2003/0152658 A1 | | 8/2003 | Ogino et al. | |

FOREIGN PATENT DOCUMENTS

| | | |
|---|---|---|
| JP | 49-33177 A | 3/1974 |
| JP | 08-020062 A | 1/1996 |
| JP | 2000-062003 A | 2/2000 |
| JP | 2002-321267 A | 11/2002 |
| JP | 2003-266517 A | 9/2003 |
| JP | 2004-017293 A | 1/2004 |
| JP | 2005-028688 A | 2/2005 |
| JP | 2005-193494 A | 7/2005 |

OTHER PUBLICATIONS

International Search Report of PCT/JP2006/300490, date of mailing Apr. 11, 2006.

\* cited by examiner

*Primary Examiner* — Yogendra Gupta
*Assistant Examiner* — Joseph Leyson
(74) *Attorney, Agent, or Firm* — Westerman, Hattori, Daniels & Adrian, LLP

(57) ABSTRACT

The invention is made to accelerate extrusion forming by reducing a friction between a forming rubber formed to cover a cord or formed to extrude and an inner wall face of a path at inside of a die as the die used for an extrusion forming head, a portion of an upstream portion of a rubber forming path (2) reaching a front end outlet (4) from a rubber storing portion (3) at inside of a die main body 1 is provided with a fluid sending inlet (8) for sending a fluid between an outer peripheral face of a forming rubber (R1) at inside of the rubber forming path (2) and an inner wall face of the path and a resistance of passing the forming rubber (R1) on a downstream side is reduced by the fluid.

5 Claims, 3 Drawing Sheets

DIE FOR EXTRUSION FORMING HEAD

TECHNICAL FIELD

The present invention relates to a die for an extrusion forming head for forming a rubber-coated cord, a ribbon-like rubber member or the like.

BACKGROUND ART

For example, for a carcass member used in a radial tire, as a carcass member (carcass ply), there is used a so-to-speak topping sheet topped (covered) with rubber by constituting a core member by a number of pieces of cords for reinforcement.

In a background art, such a carcass member for a tire is fabricated by using a so-to-speak cord fabric having a comparatively wide width woven by constituting warp by a cord mainly made of a synthetic fiber constituting the core member and roughly striking slender weft serving as a connection at necessary intervals in a warp direction and passing the cord fabric through a calender roll of a comparatively large-sized equipment to top rubber thereto.

However, according to the above-described method, there is needed a wide area for stocking a material or a fabricated carcass member such as a storage space of a material of the cord fabric or the like before being topped by the calender roll, a storage space of a carcass member after having been topped or the like, and personnels are needed for transportation or the like. Therefore, a problem is posed in a productivity and it is disadvantageous for moving tires of many product kinds and small amount production. Further, although it is conceivable to downsize the calender apparatus, by simply downsizing the calender apparatus, a time period required for topping rubber remains unchanged, and therefore, it is rather disadvantageous in view of operation rate.

Therefore, in recent years, it is proposed to form a carcass member in a strip-like shape having a comparatively slender width by aligning a plurality of pieces of cords for reinforcement and topping rubber thereto without using a cord fabric, thereby, forming a carcass layer of a tire.

For example, Patent Reference 1 and Patent Reference 2 propose to form a carcass member by aligning a plurality of pieces of cords and passing them through a die for topping with an extruder provided in the vicinity thereof, thereby, topping rubber to the cord rows to form into a strip-like shape, cutting the strip-like member by a predetermined length and successively align to bond the cut pieces on a moving drum or on a conveyer.

However, when the cut pieces of the strip-like member are aligned to bond, it is necessary to align the plurality of pieces of cords and top rubber thereto, an apparatus equipment therefor becomes complicated and expensive, time and labor are taken for cutting the strip-like member after having been topped and bonding the cut pieces, and an amount of operation is remarkably reduced.

Hence, the inventors are going to fabricate efficiently a carcass member aligned with a number of pieces of rubber-coated cords by a method of using, for example, a rubber-coated cord constituted by coating rubber to a single piece of a fiber coat, and cutting a cylindrical member formed by winding the cord in a spiral shape to develop in a width direction or the like.

Meanwhile, in covering to form rubber for a cord to provide the rubber-coated cord, a cord advancing from a rear side of an extrusion forming head of rubber continuously installed to an extruder is passed through a forming path at inside of a die provided to the head and covering rubber on a cord peripheral face in a thin film shape during a time period of passing the forming path to be formed to constitute a predetermined sectional shape.

In this case, although a covering structure can be simplified since rubber is coated to the single piece of cord, considerable high speed formation can be achieved, and a reduction in an operational efficiency can be restrained, on the contrary, when the cord passes through the rubber forming path at inside of the die, a resistance by a friction between rubber coated to be formed on a surface of a cord and an inner wall face of the path is increased, high speed formation is restrained and an increase in a production efficiency cannot be desired.

Further, although a rubber member of an inner liner or the like of a tire is formed by spirally winding a ribbon-like rubber member a section of which is constituted by a flat crescent shape or a trapezoidal shape on a forming drum, even in a case of extruding to form the ribbon-like rubber member used therefor, there is a limit in increasing a forming speed by a resistance by a friction between an outer peripheral face of the rubber member and an inner wall face of the path at inside of the die of the extrusion forming head and a further increase in the speed is desired.

Patent Reference 1: JP-A-2002-321267
Patent Reference 2: JP-A-2005-28688

DISCLOSURE OF THE INVENTION

Problems that the Invention is to Solve

The invention has been carried out in view of the above-described problem and provides a structure capable of accelerating extrusion forming and capable of firmly forming a predetermined sectional shape by reducing a friction between a forming rubber formed to cover to a cord or formed to extrude and an inner wall face of a path at inside of a die as a die used for an extrusion forming head for covering to form a rubber to, for example, a single piece of a fiber cord, or a die used in an extrusion forming head for continuously extruding to form a long ribbon-like rubber member.

Means for Solving the Problems

The invention is a die for an extrusion forming head characterized in a die mounted to an extrusion forming head of a rubber, wherein an upstream portion of a rubber forming path reaching a front end outlet from a rubber storing portion at inside of a die main body is provided with a fluid sending inlet for sending a fluid to between an outer peripheral face of a forming rubber at inside of the rubber forming path and an inner wall face of the path and provided therewith to be able to reduce a resistance of passing the forming rubber on a downstream side of the fluid sending inlet by the fluid. Thereby, a layer by the fluid is formed between the outer peripheral face of the forming rubber passing the rubber forming path and the inner wall face of the path, and a passing resistance by the friction between the forming rubber and the inner wall face of the path is reduced. Therefore, a passing speed (sending speed) can be increased without effecting an influence on an outlook shape of the forming rubber and a production efficiency can be promoted.

In the above-described, it can be constituted that the extrusion forming head is a head of covering to form rubber to a cord, which is provided such that the rubber is covered to be formed to the cord in a film-like shape and sent out from the front end outlet by advancing the cord from a rear side of the head to inside of the die main body and passing the cord to the rubber storing portion and the rubber forming path.

In this case, the rubber can be covered to be formed to a surface of the cord to constitute a predetermined sectional shape, the passing resistance can be made to be extremely small owing to a layer of the fluid between the outer peripheral face of the forming rubber and the inner wall face of the path, thereby, the rubber can be covered to be formed thereto at a high speed, and the productivity of the rubber-coated cord can considerably be promoted.

In the die for the extrusion forming head, it can be constituted that an inner diameter of the rubber forming path of the portion of the downstream side of the fluid sending inlet is formed to be slightly larger than an inner diameter of a portion on an upstream side of the fluid sending inlet over an entire length thereof. Thereby, the layer of the fluid of air or the like can firmly be formed between the inner wall face of the path on the downstream side of the fluid sending inlet and the outer peripheral face of the forming rubber covered to the cord, and therefore, the friction resistance against passing the forming rubber can be reduced as described above.

Further, in the die for the extrusion forming head, it is preferable that the portion on the downstream side of the fluid sending inlet is formed to be tapered such as a diameter thereof is gradually reduced toward the front end outlet. Thereby, the more on the front end outlet side the smaller the gap between the forming rubber and the inner wall face of the path, the more on the side of the front end outlet, the higher the pressure of the fluid. Therefore, the pressure for adhering the forming rubber covered to the cord can be supplied by the fluid pressure, and the outlook shape of the covering forming rubber can firmly be formed to constitute the predetermined sectional shape while accelerating the rubber covering speed. The longer the length of the rubber forming portion, the larger the effect. Therefore, it is preferable that a length of the downstream side of the fluid sending inlet of the rubber forming path is 4 times as much as a length of an upstream side thereof or more.

Further, the invention can also be constituted such that the extrusion forming head is a head of forming a ribbon-like rubber member, which is provided such that a sectional shape of the rubber forming path at inside of the die main body constitutes a flat shape in correspondence with the ribbon-like rubber member constituting an object of forming, and the rubber advancing from the rubber storing portion to the rubber forming path is formed in the sectional shape and sent out from the front end outlet.

In this case, the ribbon-like rubber member sent out by passing the rubber forming path at inside of the die can be formed to constitute the predetermined sectional shape, the passing resistance can be made to be extremely small owing to the layer of the fluid between the outer peripheral face of the forming rubber and the inner wall face of the path, thereby, the extrusion forming can be carried out at a high speed and the productivity of the ribbon-like rubber member can considerably be promoted.

In the die of forming the ribbon-like rubber member, it is preferable that an interval between upper and lower wall faces of a portion on the downstream side of the fluid sending inlet is slightly larger than an interval between upper and lower wall faces of a portion on an upstream side over an entire length thereof. Thereby, the layer of the fluid can firmly be formed between the inner wall face of the path on the down stream side of the fluid sending inlet and the outer peripheral face of the forming rubber, and the friction resistance against passing the forming rubber can be reduced as described above.

Particularly, it is preferable that the interval between the upper and lower wall faces of the portion on the downstream side of the fluid sending inlet is formed to be tapered to be gradually reduced toward the front end outlet, thereby, the more on the front end outlet side, the smaller the gap between the forming rubber and the inner wall face of the path, the more on the side of the front end outlet, the higher the pressure of the fluid, and therefore, an accuracy of forming an outlook shape can be promoted, and the outer shape of the forming rubber can firmly be formed to constitute the predetermined sectional shape. Particularly, when a length on the downstream side of the fluid sending inlet of the rubber forming path is 4 times as much as a length on the upstream side or more, the effect is further increased.

Advantage of the Invention

As described above, according to the die of the invention, for example, in covering to form the rubber to the cord, or in extruding to form the ribbon-like rubber member, by forming an interface layer by the fluid by sending the fluid of air or water or oil or the like to between the outer peripheral face of the forming rubber sent by passing the rubber forming path at inside of the die main body and the inner wall face of the path, the passing resistance by the friction between the outer peripheral face of the forming rubber covered to the cord or the forming rubber extruded to be formed and the inner wall face of the path can be reduced, and therefore, a passing speed (sending speed) of the rubber forming path can be constituted by a high speed, thereby, the productivity of the rubber-covered cord or the ribbon-like rubber member can be promoted considerably.

BEST MODE FOR CARRYING OUT THE INVENTION

Next, an embodiment of the invention will be explained based on an example shown in the drawings.

FIG. 1 is an enlarged sectional view showing a structure of a die attached to an extrusion forming head of rubber according to an embodiment of the invention, FIG. 2 is a sectional view of an inlet portion of sending a fluid of air or the like, and FIG. 3 is an explanatory view of a section enlarging an essential portion.

A die A1 for an extrusion forming head of FIG. 1 through FIG. 3 shows a die mounted to a head for fabricating a rubber-coated cord used for a carcass member or the like of a tire, that is, for covering to form rubber R to a cord C of a cord made of a synthetic resin, a cord made of a metal or the like, and basically constituted to cover to form the rubber R on a surface of the cord C while passing the cord C from a rear side of the head in a film-like shape. In a case of an example shown in FIG. 1 through FIG. 3, substantially the following constitution is constructed.

Notation 1 in the drawing designates a die main body having a rubber forming path 2 constituting a predetermined sectional shape in accordance with an object of forming at an axis center portion thereof, and is provided with a rubber storing portion 3 for adjusting a pressure by temporarily storing the rubber R fed from a predie portion 20, at a rear side end portion of the die main body 1, that is, a rear end portion constituting a side of being connected to the predie portion 20 of the extrusion forming head continuously provided to an extruder (not illustrated). A peripheral wall face of the rubber storing portion 3 constitutes an inclined face substantially by a shape of a circular cone and continuous to the rubber forming path 2, and the rubber forming path 2 is extended from the rubber storing portion 3 to a front end outlet 4.

The rear end portion of the die main body 1 is attached with a cap member 5 for forming the rubber storing portion 3 between the rear end portion of the die main body 1 and the cap member 5 by screwing means and the predie portion 20 is fastened to the cap member 5. Therefore, a size of the die can be changed and the die can be changed by loosening the screwing of the die main body 1 to the cap member 5 to remove.

A center portion of the cap member 5 is attached with a guide member 6 having a cord path 6a in line with the rubber forming path 2 attachably and detachably by fitting means or the like to be able to pass mainly one piece of the cord C inserted to the cord path 6a by passing a hole 22 provided to the predie portion 20 from the rubber storing portion 3 linearly to the rubber forming path 2. Further, the cap member 5 is provided with a feeding path 7 in a ring-like shape continuous to a rubber path 21 of the predie portion 20 at a surrounding of the cord path 6a to be constituted to be able to feed the rubber R around the cord C of the rubber storing portion 3. Thereby, the cord C is made to be able to pass the rubber forming path 2 in a state of covering the rubber R to the cord C penetrating to pass the rubber storing portion 3. The rubber forming path 2 forms a forming rubber R1 covered to the cord C passing at inside thereof into a predetermined sectional shape. The sectional shape of the rubber forming path 2 is not necessarily limited to a sectional shape constituting a circular shape, for example, when a rubber-coated cord having a sectional outer shape in an elliptical shape, a sectional shape of at least on a side of the front end outlet 4 of the rubber forming path 2 is formed in an elliptical shape.

An inner diameter d1 of the cord path 6a is formed to be slightly larger than a diameter d of the cord C, for example, larger than the diameter by about 0.03 through 0.10 mm, further preferably, 0.04 through 0.07mm such that a resistance of passing the cord C is not excessively increased and the rubber R does not flow back from the rubber storing portion 3. When the diameter d of the cord C used is changed by changing a size thereof, the guide member 6 may be changed to the guide member 6 having the cord path 6a in correspondence therewith. Further, by making the inner diameter d1 of the cord path 6a slightly larger than the diameter d of the cord C, even when a portion of bundling single pieces of the cords becomes slightly bolder than normal, the bundling portion is made to be able to pass therethrough.

The rubber forming path 2 of the die main body 1 is provided with a fluid sending inlet 8 for blowing to send a fluid of, for example, air or the like to between an outer peripheral face of the forming rubber R1 at inside of the rubber forming path 2 and an inner wall face of the path at a predetermined position of an upstream portion thereof, particularly, at a position slightly downstream from the rubber storing portion 3. Although as the fluid, other than a gas at a high pressure of compressed air or the like, a liquid of water, a solvent or the like, or a chemical substance or the like having a fluidity can be utilized, a gas of compressed air or the like is particularly preferably utilized in view of a structure thereof or in view of handling thereof since a press-contact force to some degree is exerted to the rubber by the fluid pressure.

In the case of drawings, an outer cylinder member 9 for supplying the fluid is fitted to an outer periphery of the die main body 1, a ring member 11 having a supply port 10 of the fluid of air or the like is attached to an outer peripheral portion of the outer cylinder member 9, thereby, a fluid rectifying chamber 12 in a ring-like shape is formed, the fluid sending inlets 8 communicating with the rubber forming path 2 are provided to be inclined to front ends thereof at a plurality of portions, for example, four portions as shown by the drawing of angular positions equally divided in a peripheral direction of the fluid rectifying chamber 12, and the fluid of air or the like is made to be able to be sent firmly and uniformly to between the outer peripheral face of the forming rubber R1 at inside of the rubber forming path 2 and the inner wall face of the path. Although a number of the fluid sending inlets 8 is not limited, in view of preventing a turbulent flow of the fluid of air or the like blown to be sent, the larger the number the more preferable within a range of not deteriorating a durability.

Numeral 13 in the drawing designates a member of fixing the ring member 11, which is screwed to an outer peripheral screw portion 14 of the outer cylinder member 8.

The rubber forming path 2 is formed by constituting a portion thereof upstream from the fluid sending inlet 8 as a rubber covering portion 2a and a portion thereof downstream therefrom as a rubber forming portion 2b constituting a predetermined sectional shape of a circular shape, an elliptical shape or the like mentioned above. Further, an inner diameter of the rubber forming portion 2b is formed to be slightly larger than an inner diameter of the rubber covering portion 2a over an entire length thereof to be able to form a layer of the fluid between an inner wall face of a path of the rubber forming portion 2b on the downstream side and the outer peripheral face of the forming rubber R1. In carrying out the embodiment, with regard to the rubber forming portion 2b on the downstream side of the fluid sending inlet 8, it is preferable that the rubber forming portion 2b is formed by attaching a taper such that the inner diameter is gradually reduced toward the front end outlet 4 in view of a rubber covering effect. In this case, the inner diameter of the front end outlet 4 on a small diameter side of the rubber forming portion 2b is set to be slightly larger than the inner diameter of the rubber covering portion 2a. Further preferably, a length of the rubber forming portion 2b is formed to be about 4 times larger or more of a length of the rubber covering portion 2a since the fluid pressure of air or the like blown to be sent can be utilized for forming the outer peripheral face of the rubber R covered to the cord C, which is preferable.

Although with regard to inner diameters of the respective portions, in consideration of an expansion coefficient of the rubber R covered to the cord C, the inner diameters can pertinently be set in accordance with an aimed rubber covering diameter, normally, when the inner diameter of the rubber covering portion 2a is designated by notation d2, an inner diameter on a large diameter side continuous from the fluid sending inlet 8 of the rubber forming portion 2b constituting the taper shape is designated by notation d3, and an inner diameter of the front end outlet 4 constituting the small diameter side is designated by notation d4, the respective inner diameters are set to establish a relationship of $d<d1<d2<d4<d3$ relative to the diameter d of the cord C and the inner diameter d1 of the cord path 6a.

Normally, diameter differences of the respective portions are set such that when a difference between the diameter d of the cord C and the inner diameter d2 of the rubber covering portion 2a is set to 1, the differences between the inner diameters d3 and d4 of the rubber forming portion 2b and the cord diameter d are respectively set to about 1.7 through 1.8 and 1.5 through 1.6. As an example thereof, when the diameter d of the cord C is 1.0 mm and the aimed rubber covering diameter is 1.10 through 1.15 mm, in consideration of the expansion coefficient or the like of the covered rubber R, the inner diameter d2 of the rubber covering portion is set to 1.10 mm, the inner diameter d3 of the large diameter side of the rubber forming portion 2b constituting the taper shape is about 1.18 mm, and the inner diameter d4 of the front end outlet 4 is set to around 1.16 mm. Further, also a short diameter and a long diameter in a case of a shape of an ellipse, the diameters are set to establish a relationship substantially similar to the above-described.

As described above, by attaching the diameter differences to the inner diameter dl of the cord path 6a and the inner diameters d2, d3 and d4 of the respective portions of the rubber forming path 2 relative to the diameter d of the cord C, even when a portion of jointing the cords (portion of bundling single strings by a bundling apparatus for a single string) which becomes slightly larger than normal is present, the portion is made to be able to pass therethrough without a problem.

The die A1 constructed by the above-described constitution is mounted to be used to the extrusion forming head for fabricating the rubber-coated cord by covering the rubber R to a single piece of the cord C, at that occasion, the cord C is inserted to the cord path 6a of the guide member 6 provided to the center portion of the cap 5 from the rear side of the predie portion 20 of the extrusion forming head continuously provided to the extruder, passed through the rubber forming path 2 by penetrating the rubber storing portion 3 at the rear end portion of the die main body 1 and drawn out continuously from the front end outlet 4.

On the other hand, the rubber R extruded to be fed from the feeding path 7 in the ring-like shape by way of the rubber path 21 of the predie portion 20 by operating the extruder is brought into a state of being filled in the rubber storing portion 3 to be stored, and passed through the rubber covering portion 2a of the rubber forming path 2 in a state of being attached to the outer peripheral face of the cord C in accordance with passing the cord C while adjusting a pressure thereof, thereby, covered to the cord C by a thickness in accordance with an inner diameter d2 of the rubber covering portion 2a, further, passes through the rubber forming portion 2b on the downstream side by way of the fluid sending inlet 8, thereby, formed to constitute a predetermined sectional shape in correspondence with the rubber forming portion 2b and sent out from the front end outlet 4.

Further, in passing the rubber forming portion 2b of the rubber forming path 2, the fluid of compressed air or the like is blown to be sent by a predetermined pressure (for example, 0.3 through 1.0 Mpa) from the fluid sending inlet 8 present between the rubber forming portion 2b and the rubber covering portion 2a upstream therefrom, an extremely thin layer of the fluid is formed between the forming rubber R1 covered to the cord C and the inner wall face of the path of the rubber forming portion 2b, and injected from the front end outlet portion 4 along with the rubber-coated cord, and therefore, a resistance of passing the covered forming rubber R1 is considerably reduced, also in accordance with operation of injecting the fluid, the rubber can be covered to be formed while passing therethrough at a speed far faster than that of the background art.

Further, although the inner diameter of the rubber forming portion 2b on the downstream side of the fluid sending inlet 8 is larger than inner diameter d2 of the rubber covering portion 2a on the upstream side and a thin layer of the fluid is formed as described above, by forming the rubber forming portion 2b by attaching the taper such that the diameter is gradually reduced toward the front end outlet 4, the more on the side of the front end outlet 4, the smaller the gap between the covered forming rubber R1 and the inner wall face of the path, the more on the side of the front end outlet 4, the higher the pressure and the faster the flow speed of the fluid, and therefore, the pressure for adhering the forming rubber R1 covered to the cord C can be supplied by the fluid pressure, and the outer shape of the forming rubber R1 can accurately and firmly be formed to constitute the predetermined sectional shape while forming to cover the rubber at a high speed. The longer the length of the rubber forming portion 2b, the larger the forming effect.

In the above-described example, when a chemical substance or the like capable of improving an adherence of rubber is used as the fluid described above, also the adherence of the forming rubber R1 is also improved, and therefore, bonding of the respective cords in the aligned state is facilitated when the fabricated rubber-covered cord is used for the constitution of the carcass member.

Further, the invention is not limited to cover to form the rubber R to a single piece of the cord C, but can also be used in a case of covering the rubber to a plurality of pieces of the cords. In that case, the cord path 6a, the rubber forming path 2 and the like are formed to constitute sectional shapes suitable for covering the rubber by passing a plurality of pieces of cords.

Further, the invention can be embodied not only in the die Al of the above-described example for covering to form the rubber to the cord but a die used by being mounted to the extrusion forming head for extruding to form a ribbon-like rubber member by constituting the die as exemplified in FIG. 4 and FIG. 5.

A die A2 of the embodiment of FIG. 4 and FIG. 5 is constructed by a constitution basically similar to that of the die A1 for fabricating the rubber-coated cord mentioned above except that the die A2 is not constructed by the constitution of passing the cord and that a rubber forming path 102 is constituted by a sectional shape in correspondence with a ribbon-like rubber member constituting an object of forming.

That is, in the case of the example, the sectional shape of the rubber forming path 102 at inside of a die main body 101 constitutes a flat shape in correspondence with the ribbon-like rubber member of the object of forming of a flat crescent or a trapezoidal shape or the like in a section thereof, and is constituted such that rubber advancing to the rubber forming path 102 from a rubber storing portion 103 of the die main body 101 is formed in the sectional shape and sent out from a front end outlet 104. Further, a cap member 105 attached to a rear end portion of the die main body 101 is only provided with a feeding path 107 of the rubber R fed from the extruder at a center portion and is not provided with a guide member for inserting the cord.

Further, a portion of an upstream portion of the rubber forming path 102 of the die main body 101 is provided with fluid sending inlets 108 for sending a fluid of air or the like to the rubber forming path 102 on upper and lower sides thereof, and formed to be able to flow to send the fluid to between the forming rubber R1 at inside of the rubber forming path 102 and upper and lower wall faces of inside of the path by a predetermined pressure. A portion of the rubber forming path 102 on an upstream side of the fluid sending inlet 108 is formed as a rubber advancing portion 102a and a portion thereof on a downstream side is formed as a rubber forming portion 102b. Further, an interval between upper and lower wall faces of the rubber forming portion 102b is formed to be slightly larger than an interval between upper and lower wall faces of the rubber advancing portion 102a on the upstream side over the entire length to be able to form a layer of the fluid blown to be sent from the fluid sending inlet 108 to between an inner wall face of the path and an outer peripheral face of the forming rubber.

The interval between the upper and lower wall faces of the rubber forming portion 102b on the downstream side of the fluid sending inlet 108 of the rubber forming path 102 is formed to be tapered to be gradually reduced toward the front end outlet 104. Further, a length of the rubber forming path 102 on the downstream side of the fluid sending inlet 108 is made to be 4 times as much as a length on an upstream side thereof.

Respective constitutions of a supply port 110, an outer cylinder member 109, a fluid rectifying chamber 112 and a ring member 111 for forming the rectifying chamber, as well as a fixing member 113 and the like for blowing to send the fluid according to the embodiment are substantially the same as those of the embodiment mentioned above, and therefore, an explanation thereof will be omitted.

In a case of the die A2 of the embodiment, the rubber R fed from the extruder is stored to fill in the rubber storing portion 103 and adjusted in a pressure thereof, thereafter, advances to the rubber advancing portion 102a of the rubber forming path 102, passes through the rubber forming path 102 byway of a portion of the fluid sending inlet 108, formed into a predetermined sectional shape and is sent from the front end outlet 104. When the forming rubber R1 passes through the rubber forming portion 102b, a thin layer is formed between the forming rubber R1 and the up and down wall faces at inside of the path by blowing to send the fluid from the fluid sending inlet 108 by a predetermined pressure, and therefore, a passing resistance by a friction between the outer peripheral face of the forming rubber R1 and the upper and lower wall faces at inside of the path becomes extremely small, a speed of passing to send the formed ribbon-like rubber member can be made to be fast by that amount, thereby, the productivity by extruding to form the ribbon-like rubber member can considerably be promoted.

Further, by forming the rubber forming portion 102b to be tapered to the front end outlet 104, the more on the side of the front end outlet 104, the smaller the gaps between the forming rubber R1 and the upper and lower wall faces at inside of the path, the more on the side of the front end outlet 104, the higher the pressure of the fluid and the faster the flow speed, and therefore, the outer shape of the forming rubber R1 is made to be able to be formed accurately to constitute the predetermined sectional shape.

INDUSTRIAL APPLICABILITY

The die of the invention can preferably be utilized to a die of an extrusion forming head for fabricating a rubber-coated cord by covering to form rubber to, for example, a single piece of a cord made of a synthetic fiber or a cord made of a metal, or a die of an extrusion forming head for continuously extruding to form a long rubber member of a long ribbon-like rubber member or the like.

Description of Reference Numerals

Figure 1:
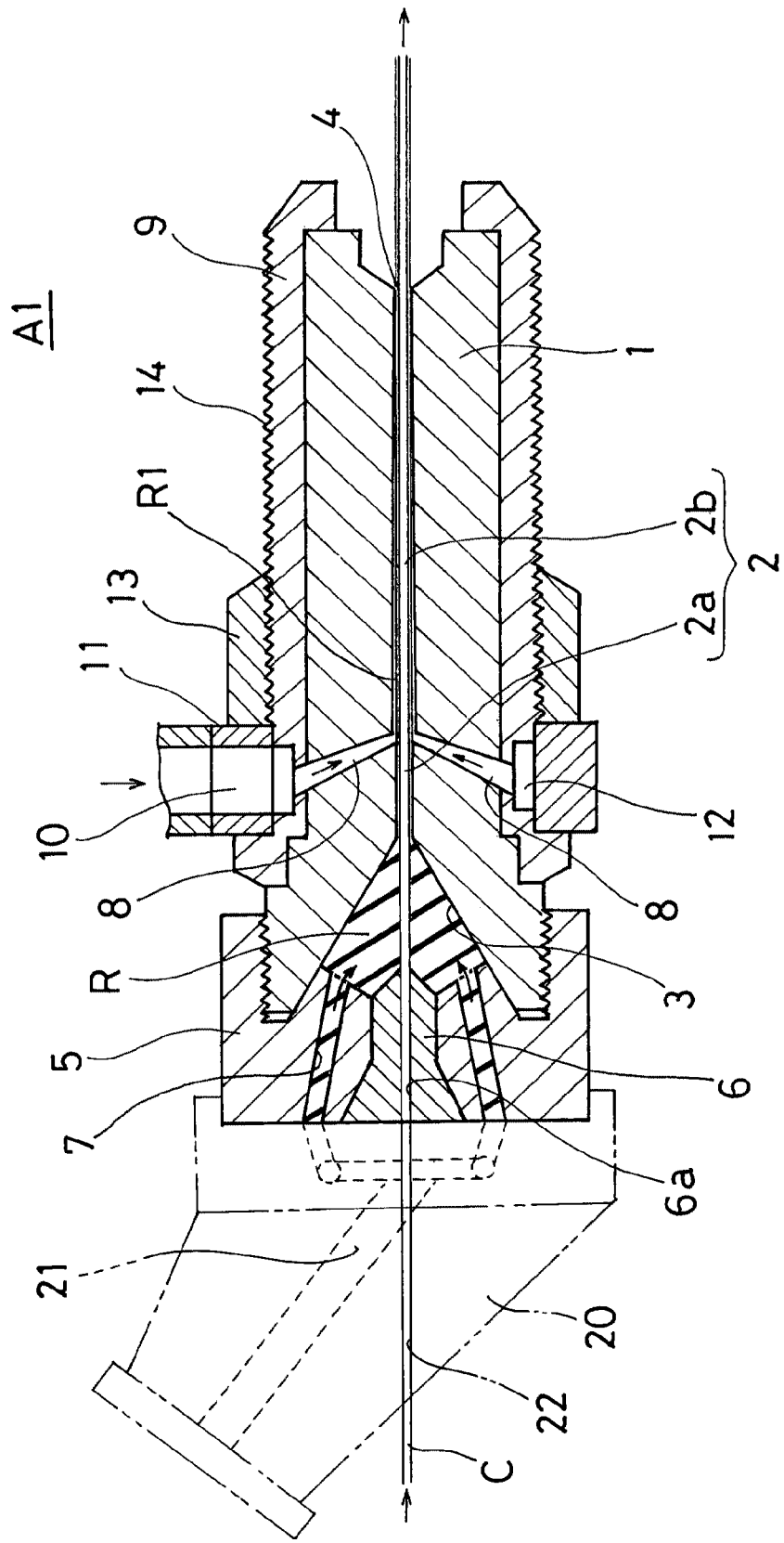
FIG. 1 is a sectional view showing an outline of a structure of a die mounted to an extrusion forming head of an example of the invention.
Figure 2:
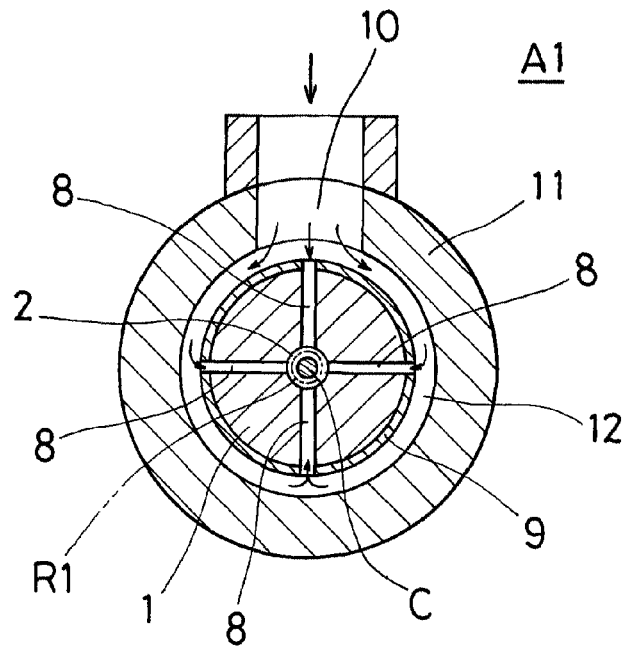
FIG. 2 is a sectional view of a portion of an inlet of sending a fluid of air or the like of the same.
Figure 3:
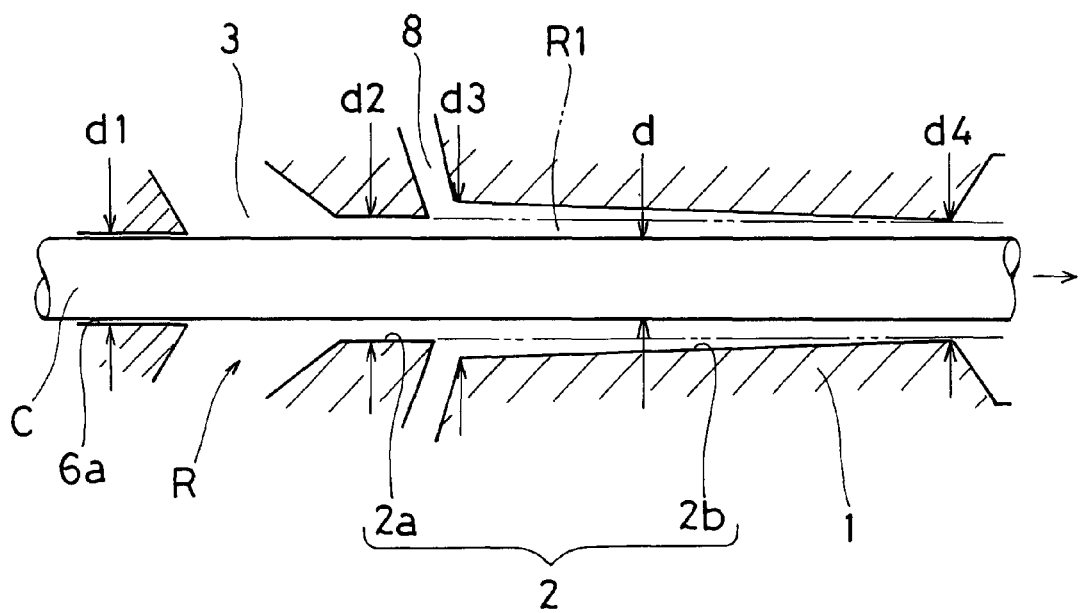
FIG. 3 is an explanatory view by a section enlarging an essential portion of the same.
Figure 4:
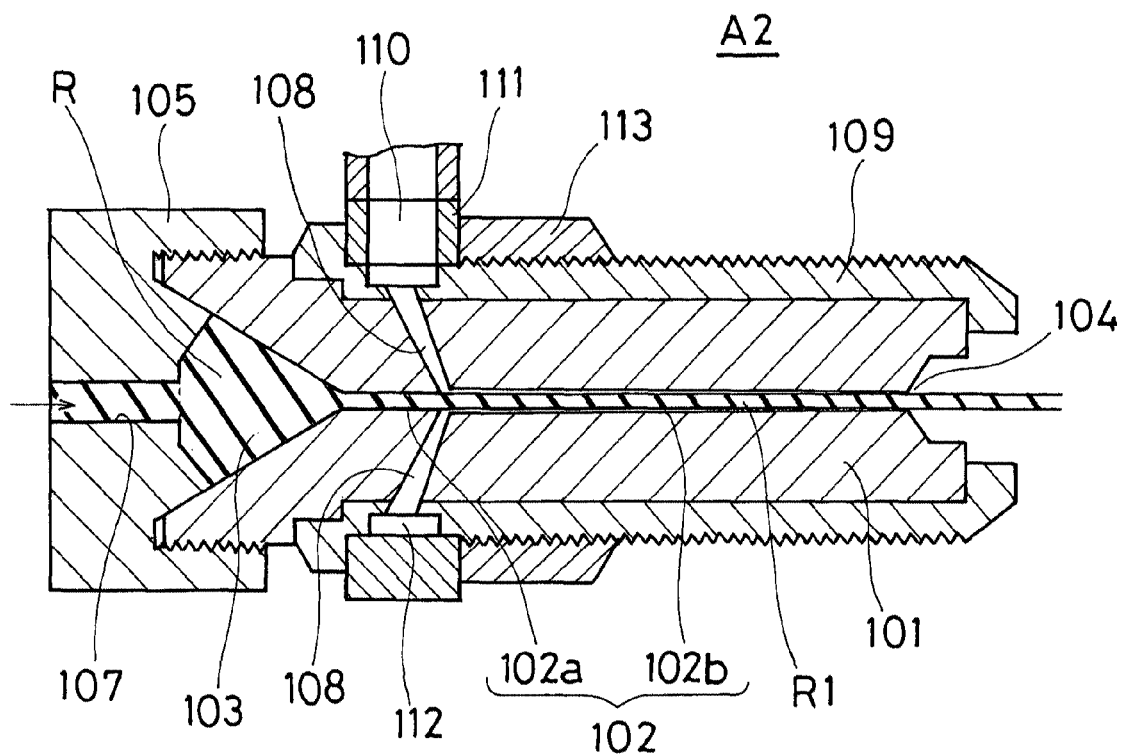
FIG. 4 is a sectional view showing an outline of a structure of a die of other example.
Figure 5:
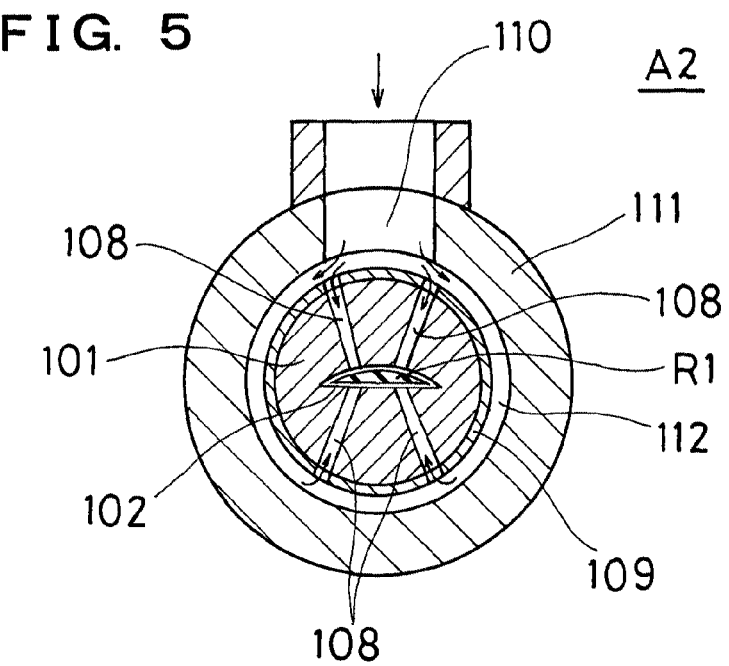
FIG. 5 is a sectional view of a portion of an inlet of sending a fluid of air or the like of the same.

A1 ... die, C ... cord, R ... rubber, R1 ... forming rubber, 1 ... die main body, 2 ... rubber forming path, 2a ... rubber covering portion, 2b ... rubber forming portion, 3 ... rubber storing portion, 4 ... front end outlet, 5 ... cap member, 6 ... guide member, 6a ... cord path, 7 ... feeding path, 8 ... fluid sending inlet, 9 ... outer cylinder member, 10 ... supply port of fluid, 11 ... ring member, 12 ... fluid rectifying chamber, 13 ... fixing ring, 14 ... outer peripheral screw portion, 20 ... predie portion, 21 ... rubber path, A2 ... die, 101 ... die main body, 102 ... rubber forming path, 102a ... rubber advancing portion, 102b ... rubber forming portion, 103 ... rubber storing portion, 104 ... front end outlet, 105 ... cap member, 107 ... feeding path, 108 ... fluid sending inlet, 109 ... outer cylinder member, 110 ... supply port of fluid, 111 ... ring member, 112 ... fluid rectifying chamber, 113 ... fixing ring

The invention claimed is:

1. A die for an extrusion forming head, which is mounted to a head for extrusion forming of a rubber, wherein an upstream portion of a rubber forming path reaching a front end outlet from a rubber storing portion at inside of a die main body is provided with a fluid sending inlet for sending a fluid to between an outer peripheral face of a being-formed rubber at inside of the rubber forming path and an inner wall face of the rubber forming path; an inner diameter of the rubber forming path or distance between upper and lower wall faces of the rubber forming path is larger at each portion on downstream of the fluid sending inlet than at any portion on upstream of the fluid sending inlet, in respect of an entire length of the rubber forming path; and, the inner diameter of the rubber forming path or distance between upper and lower wall faces of the rubber forming path is gradually reduced as tapered from the fluid sending inlet to the front end outlet of the rubber forming path; so as to reduce a resistance of passing the being-formed rubber on downstream of the fluid sending inlet, by said fluid.

2. The die for an extrusion forming head according to claim 1, wherein the extrusion forming head is a head of covering to form rubber to a cord, which is provided such that the rubber is covered to be formed to the cord in a film-like shape and sent out from the front end outlet by advancing the cord from a rear side of the head to inside of the die main body and passing the cord to the rubber storing portion and the rubber forming path.

3. The die for an extrusion forming head according to claim 2, wherein a length of the downstream side of the fluid sending inlet of the rubber forming path is 4 times as much as a length of an upstream side thereof or more.

4. The die for an extrusion forming head according to claim 1, wherein the extrusion forming head is a head of forming a ribbon-like rubber member, which is provided such that a sectional shape of the rubber forming path at inside of the die main body constitutes a flat shape in correspondence with the ribbon-like rubber member constituting an object of forming, and the rubber advancing from the rubber storing portion to the rubber forming path is formed in the sectional shape and sent out from the front end outlet.

5. The die for an extrusion forming head according to claim 4, wherein a length on the downstream side of the fluid sending inlet of the rubber forming path is 4 times as much as a length on the upstream side or more.

* * * * *